(12) United States Patent
Zhao et al.

(10) Patent No.: US 8,170,148 B2
(45) Date of Patent: *May 1, 2012

(54) DEMODULATION CIRCUIT, DIGITAL MICROWAVE SYSTEM AND DEMODULATION METHOD

(75) Inventors: Guixue Zhao, Chengdu (CN);
Tianxiang Wang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/270,108

(22) Filed: Oct. 10, 2011

(65) Prior Publication Data

US 2012/0027129 A1 Feb. 2, 2012

Related U.S. Application Data

(63) Continuation of application No. 12/416,390, filed on Apr. 1, 2009, which is a continuation of application No. PCT/CN2008/070020, filed on Jan. 4, 2008.

(30) Foreign Application Priority Data

May 16, 2007 (CN) .......................... 2007 1 0099306

(51) Int. Cl.
*H03D 1/24* (2006.01)
(52) U.S. Cl. ........ 375/320; 375/340; 375/316; 375/322; 375/238; 375/239; 375/272; 329/311
(58) Field of Classification Search .................. 375/320, 375/340, 316, 322, 238, 239, 272; 329/311
See application file for complete search history.

(56) References Cited

U.S. PATENT DOCUMENTS

| 4,166,979 | A * | 9/1979 | Waggener | 375/376 |
| 4,227,225 | A * | 10/1980 | Nishikawa | 360/128 |
| 4,435,821 | A * | 3/1984 | Ito et al. | 375/137 |
| 6,434,194 | B1 * | 8/2002 | Eisenberg et al. | 375/238 |
| 6,970,681 | B2 * | 11/2005 | Darabi et al. | 455/73 |
| 7,061,985 | B2 * | 6/2006 | Le Van Suu | 375/259 |
| 7,154,974 | B2 * | 12/2006 | Jensen et al. | 375/355 |
| 7,283,037 | B2 * | 10/2007 | Diorio et al. | 340/10.51 |
| 7,769,114 | B2 * | 8/2010 | Taya | 375/340 |

(Continued)

FOREIGN PATENT DOCUMENTS

CN 1518426 A 8/2004

(Continued)

OTHER PUBLICATIONS

1$^{st}$ Office Action in corresponding European Application No. 08700049.6 (Feb. 26, 2010).
U.S. Appl. No. 12/416,390 (Sep. 29, 2011).
Extended European Search Report in corresponding European Application No. 08700046.9 (Feb. 26, 2010).

(Continued)

*Primary Examiner* — Kenneth Lam
(74) *Attorney, Agent, or Firm* — Leydig, Voit & Mayer, Ltd.

(57) ABSTRACT

A demodulation circuit, a digital microwave system including the demodulation circuit, and a signal demodulation method are provided. The demodulation circuit includes a first circuit, a second circuit, a third circuit, and a fourth circuit connected in turn. The fourth circuit includes a pulse counting unit and a data decision unit connected in turn. The signal demodulation method includes: performing bandpass filtering on input signals; increasing gains of the bandpass filtered signals; extracting pulse signals are extracted from the gain-increased signals; counting the extracted pulse signals; filtering the pulse signals having counting values falling outside of a predetermined range, and outputting the filtered pulse signals.

13 Claims, 4 Drawing Sheets

U.S. PATENT DOCUMENTS

| | | | | |
|---|---|---|---|---|
| 2003/0076164 A1* | 4/2003 | Khorram | | 329/300 |
| 2005/0063491 A1* | 3/2005 | Saloka | | 375/322 |
| 2005/0232376 A1* | 10/2005 | Liem et al. | | 375/322 |
| 2006/0138231 A1* | 6/2006 | Elberbaum | | 235/439 |

FOREIGN PATENT DOCUMENTS

| | | | |
|---|---|---|---|
| CN | 1794594 | A | 6/2006 |
| CN | 1953438 | A | 4/2007 |
| EP | 0 845 751 | A1 | 6/1998 |
| JP | 2006-060340 | A | 3/2006 |
| JP | 2006-205838 | A | 8/2006 |

OTHER PUBLICATIONS

Written Opinion of the International Searching Authority in corresponding PCT Application No. PCT/CN2008/070020 (Apr. 17, 2008).

International Search Report in corresponding PCT Application No. PCT/CN2008/070020 (Apr. 17, 2008).

1st Office action in corresponding Chinese Application No. 200710099306.7 (Nov. 6, 2009).

Lindquist et al., "Design of Demodulators Using Time-Varying Adaptive Digital Filters," IEEE Proceedings of the $33^{rd}$ Midwest Symposium on Circuits and Systems, pp. 76-79 (Aug. 1990).

* cited by examiner

DEMODULATION CIRCUIT, DIGITAL MICROWAVE SYSTEM AND DEMODULATION METHOD

CROSS-REFERENCE TO RELATED APPLICATIONS

This application is a continuation of U.S. patent application Ser. No. 12/416,390, filed on Apr. 1, 2009, which is a continuation of International Patent Application No. PCT/CN2008/070020, filed on Jan. 4, 2008. The International Patent Application claims priority to Chinese Patent Application No. 200710099306.7, filed on May 16, 2007. The aforementioned patent applications are hereby incorporated by reference in their entireties.

FIELD OF THE TECHNOLOGY

The present invention relates to a digital microwave communication technology, and more particularly to a demodulation circuit, a digital microwave system, and a demodulation method.

BACKGROUND

Amplitude shift keying (ASK) and frequency shift keying (FSK) demodulation circuits are units configured to demodulate received signals in a digital microwave system receiving circuit, and are usually provided in an indoor unit of the digital microwave system. The indoor unit is usually connected with an outdoor unit through an intermediate frequency cable.

The intermediate frequency cable is configured to transmit intermediate frequency signals, low frequency control signals, and power. The low frequency control signals are configured to provide the communication between the indoor unit and the outdoor unit, and the ASK or FSK modulation technologies are generally used to perform modulations and demodulations.

On one side that transmits the control signals, it is relatively simple to perform the modulation of the control signals. While on the other side that receives the control signals, it is relatively complicated to demodulate the modulated control signals. The reason mainly lies in that coupling of DC power tends to introduce broadband switch noises, and these noises are very difficult to be filtered completely by filters of receiving side equipments, and tend to form several interference pulses after passing through a detection circuit. At this time, if a threshold value of a decision circuit happens to be set somewhat low, or the signal amplitude is relatively small, error codes tend to occur.

Referring to FIGS. 1 and 2, a conceptual circuit block diagram of an ASK or FSK demodulation device is shown respectively. An ASK or FSK demodulation device commonly used in the industry is composed of a bandpass filter 4, an envelope detection circuit 5, a low-pass filter circuit 6, and a sampling decision circuit 7 connected in turn. The sampling decision circuit 7 inputs a timing pulse 2 for sampling. The two are different in that, the ASK demodulation circuit inputs a signal 1 that has only one frequency, while an FSK signal 3 is modulated with two frequencies (usually not separated very far). The FSK demodulation circuit needs to filter the signals of the two different frequencies respectively. Therefore, the FSK demodulation circuit has loops respectively configured to demodulate the signals of two different frequencies.

In microwave communication, the low frequency ASK signal 1 is often transmitted with a DC power, and wideband switch noises generally exist in the power. In the circuit shown in FIG. 1, the bandpass filter 4 cannot filter completely the switch noises, and thus the switch noises tend to form pulse interferences after passing through the envelope detection circuit 5. When a threshold of the sampling decision circuit 7 is set relatively small, the output data tends to have error codes. But when small signals are considered, the threshold cannot be set too high, which causes a weak pulse interference resistance capability of the demodulation circuit.

The principle of the FSK demodulation circuit shown in FIG. 2 is similar to that of the ASK demodulation circuit shown in FIG. 1. The two are different in that, because the FSK modulation signal 3 has signals of two frequencies, the FSK demodulation circuit has to perform bandpass filtering, envelope detections, low-pass filtering, and sampling decisions respectively on the signals of two different frequencies. Therefore, the FSK demodulation circuit shown in FIG. 2 has the same shortcomings as those of the ASK demodulation circuit shown in FIG. 1. In addition, because the two frequencies in the FSK modulation signal are closer, the design of the filter becomes more difficult consequently.

Moreover, the ASK demodulation circuit and the FSK demodulation circuit are only suitable for ASK demodulations or FSK demodulations respectively. Users of the digital microwave system may purchase different indoor units or outdoor units from different equipment manufacturers respectively. If the indoor units use the ASK signals, and the outdoor units use the FSK signals, the users of the digital microwave system or the equipment manufacturers need to make corresponding reconstruction to the demodulation circuits of the indoor units or the outdoor units, thus making the two compatible with each other. In existing systems, corresponding hardware circuit designs need to be changed when there are changes to the modulation schemes of the equipments, which is quite inconvenient.

SUMMARY

The present invention is directed to a demodulation circuit which enables a demodulation circuit of a digital microwave system to demodulate both ASK signals and FSK signals.

The present invention is further directed to a digital microwave system, an indoor unit, and/or an outdoor unit of which can demodulate both ASK signals and FSK signals, so that either the indoor unit or the outdoor unit may conveniently communicate with a digital microwave equipment using ASK or FSK signal demodulation at will.

The present invention is further directed to a demodulation method, which is capable of demodulating both ASK signals and FSK signals.

The demodulation circuit provided by an embodiment of the present invention includes: (1) a first circuit, configured to perform bandpass filtering on input signals; (2) a second circuit, configured to increase gains of the signals generated by the first circuit after the bandpass filtering; (3) a third circuit, configured to extract pulse signals from signals output from the second circuit, and (4) a fourth circuit, configured to count the pulse signals extracted by the third circuit, perform a data decision based on the counting, and output digital demodulation data.

In the above demodulation circuit, the first circuit is configured to filter the clutters in the ASK signals or the FSK signals, the second circuit is configured to increase gains of the ASK signals or the FSK signals after passing through the first circuit, the third circuit is configured to extract pulses from the ASK signals or the FSK signals according to a preset threshold voltage, and the fourth circuit is configured to count the extracted pulse signals, perform data decision based on the counting, and output digital demodulation data.

Based on the above embodiments of the present invention, the demodulation circuit is capable of demodulating both ASK signals and FSK signals. The same circuit may configure to demodulation of different signals, when the above demodulation circuit is provided on the indoor unit or the outdoor unit of the digital microwave system, the hardware circuits do not need to be changed because of the difference in modulation signals of the indoor unit and the outdoor unit, and thus the above demodulation circuit can be used to demodulate the ASK signals or the FSK signals conveniently.

A digital microwave system provided by the present embodiments includes an indoor unit, an outdoor unit, and an intermediate frequency cable connecting the indoor unit and the outdoor unit. A demodulation circuit in the indoor unit and the outdoor unit includes a first circuit configured to perform bandpass filtering on input signals, a second circuit configured to increase gains of the signals generated by the first circuit after the bandpass filtering, a third circuit configured to extract pulse signals from signals output from the second circuit, and a fourth circuit configured to count the pulse signals extracted by the third circuit, perform a data decision based on the counting, and output demodulation data.

In the above demodulation circuit in the indoor unit or the outdoor unit, the first circuit is configured to filter the clutters in the ASK signals or the FSK signals, the second circuit is configured to increase the gains of the ASK signals or the FSK signals after passing through the first circuit, the third circuit is configured to extract pulses from the ASK signals or the FSK signals according to a preset threshold voltage, and the fourth circuit is configured to count the extracted pulse signals, perform data decision based on the counting, and output the digital demodulation data.

The above digital microwave system capable of demodulating both ASK signals and FSK signals may set the demodulation circuit therein flexibly and conveniently to the manner of demodulating the ASK signals or the FSK signals without the need to change the hardware circuit of the demodulator because of the difference in modulation signals of the indoor unit and the outdoor unit, and thus the above demodulation circuit can be used quite conveniently to demodulate the ASK signals or the FSK signals.

A demodulation method provided by the present embodiments includes: (1) performing bandpass filtering on input ASK or FSK signals; (2) increasing gains of the filtered ASK signals or the FSK signals after the bandpass filtering; (3) extracting pulse signals extracted from the gain-increased filtered ASK signals or the FSK signals after increasing gains; (4) counting the extracted pulse signals; and (5) outputting filtered pulse signals after filtering pulse signals having counting values falling outside of a predetermined value range.

In the above technical solutions, the purpose of performing bandpass filtering on the input ASK signals or the FSK signals is to filter the clutters in the ASK signals or the FSK signals. An amplifying circuit/amplifier can be used to amplify the ASK signals or the FSK signals after passing through the bandpass filtering circuit, so as to increase the gains of the signals. Pulse signals may be extracted from the ASK signals or the FSK signals with increased gains according to a preset threshold voltage. After counting the extracted pulse signals, the pulses below corresponding threshold value are filtered, and the demodulation data carried by the ASK signals or the FSK signals are output.

By utilizing the technical solutions of the present embodiments, the demodulation part in the indoor unit or the outdoor unit of the digital microwave system of the embodiments is capable of demodulating both the ASK signals and the FSK signals, and can be disposed flexibly.

The content of the present invention is further described in detail below through specific embodiments.

BRIEF DESCRIPTION OF THE DRAWINGS

The present invention will become better understood from the detailed description given herein below for illustration only, and thus are not limitative of the present invention, and wherein.

DETAILED DESCRIPTION

Figure 1:
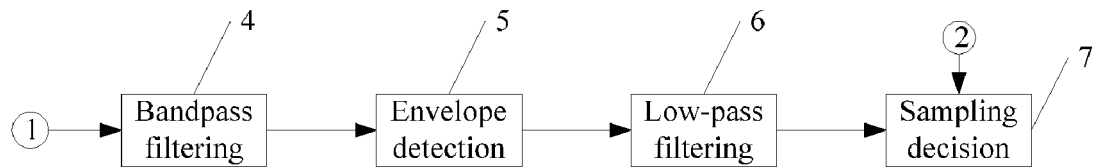
FIG. 1 is a schematic circuit diagram of a conventional ASK demodulation device.
Figure 2:
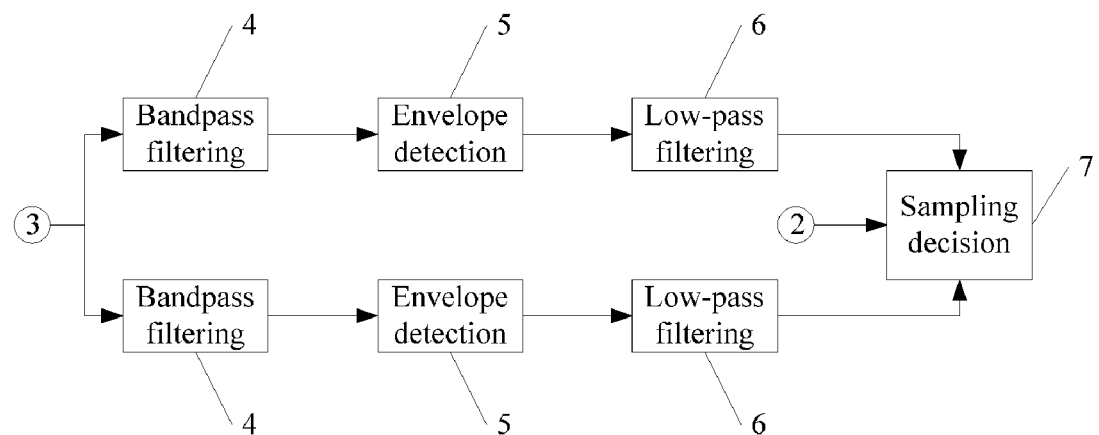
FIG. 2 is a schematic circuit diagram of a conventional FSK demodulation device.
Figure 3:
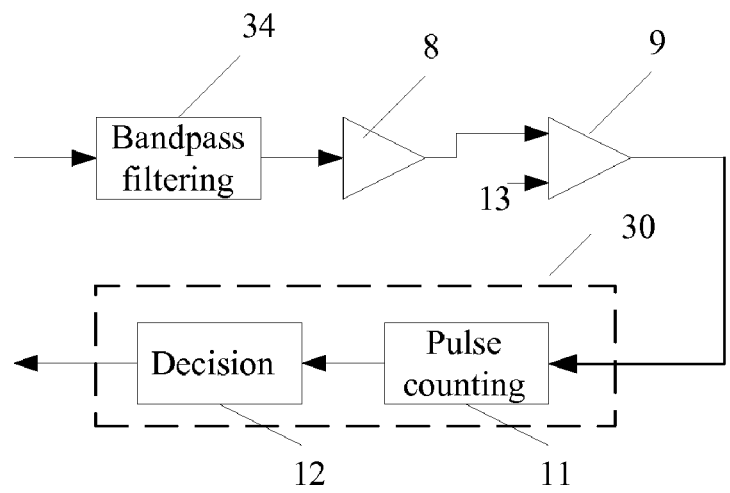
FIG. 3 is a conceptual schematic view of a demodulation circuit according to a first embodiment of the present invention.

Referring to FIG. 3, a schematic view of a demodulation circuit being capable of demodulating both ASK signals and FSK signals according to a first embodiment of the present invention is shown. The circuit includes a first circuit 34, a second circuit 8, a third circuit 9, and a fourth circuit 30 connected in turn. The fourth circuit 30 is composed by a first unit 11 and a second unit 12 connected in turn.

In the embodiment, the first circuit 34 may be a bandpass filter, which functions to perform filtering on the input ASK signals or the FSK signals to filter other signals possibly carried therein. The signals passing through the first circuit 34 are then amplified in signal magnitude by a second circuit 8 which has a gain of 10-35 dB. The second circuit 8 may be an amplifier, and how much gain value is adopted when amplifying the signals depends on the intensity of the bandpass filtered signals. If the signal intensity is relatively low, the gain value should be made higher, for example, 30 dB, and 35 dB. If the signal intensity is relatively high, the gain value should be made smaller, for example, 10 dB, and 15 dB. Generally, it is appropriate to set the gain value to 20 dB. In practice, the gain value may be even set to ranges smaller than 10 dB or higher than 35 dB according to specific signal intensity, which depends on actual system gain. It is well known to those skilled in the art how to set amplifying gain in actual cases.

The amplified signals are restored to pulse strings through a preset threshold voltage 13 in the third circuit 9. In this embodiment, the third circuit 9 is implemented by a comparison circuit, one input to the comparison circuit is the above signals amplified by the second circuit 8, and another input is the threshold voltage 13. In other embodiments, the pulse signals may also be extracted by using means other than comparison circuit, for example, the extraction of pulse signals can also be realized by using a Zener diode.

The pulse strings extracted by the third circuit 9 are sent to a fourth circuit 30 composed by a first unit 11 and a second unit 12 connected in turn, so as to undergo digital filtering and pulse demodulation, and finally be restored to communication data. The first unit 11 functions to count the effective pulses in the gain-increased signals, and the second unit 12 decides the counting result output from the first unit 11 according to specific signal modulation schemes, and output the demodulated data. Here, the specific signal modulation schemes on the signals by the second unit 12 can be provided beforehand in the second unit 12.

Figure 4:
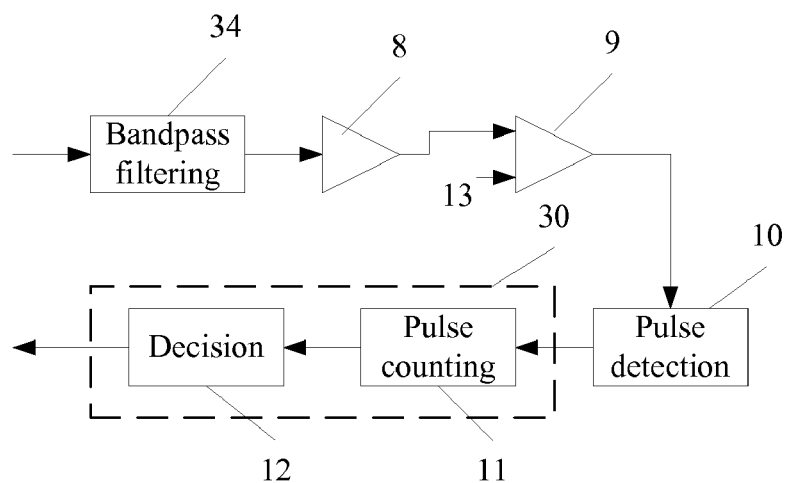
FIG. 4 is a conceptual schematic view of a demodulation circuit according to a second embodiment of the present invention.

Referring to FIG. 4, in the circuit of the above embodiments, a third unit 10 can also be connected in series between the third circuit 9 and the second unit 11. The third unit 10 functions to detect the pulse signals extracted by the third circuit 9 according to a reference clock signal having a frequency much higher than the signal frequency, so as to filter the burr pulses with pulse widths smaller than a desired width. That is to say, the scattered pulses (usually interference) are filtered, so as to only output effective pulse signals to the first unit 11.

In a specific circuit implementation, the third unit 10, the first unit 11, and the second unit 12 can be integrated together to form an integrated hardware circuit or a chip, or can be provided in a specific demodulation device as separate elements. No matter what kind of specific circuit or device patterns are used, persons skilled in the art can select according to specific product design demand based on their technical knowledge.

Figure 5:
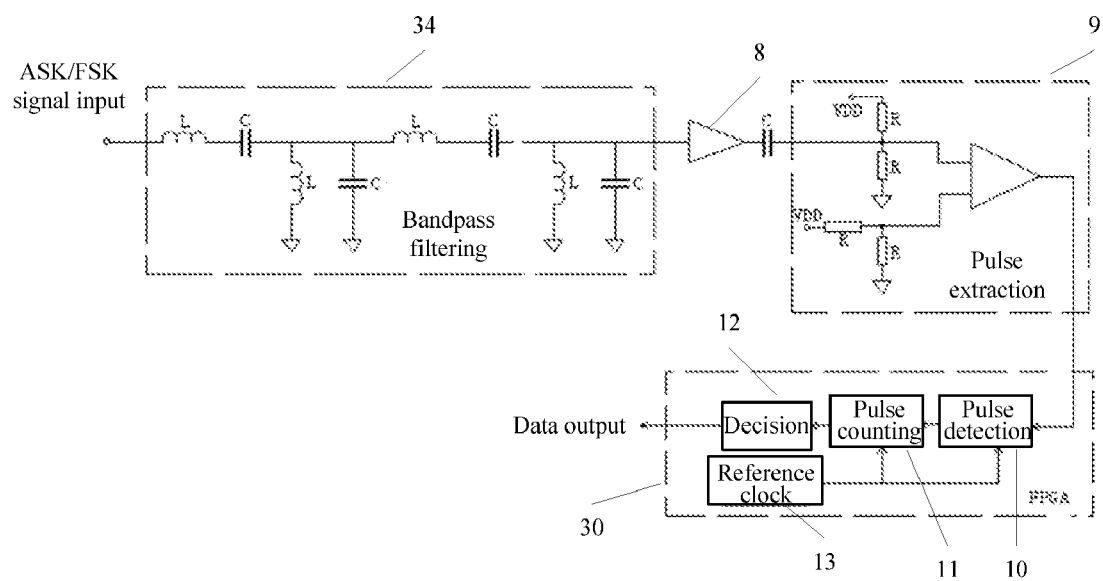
FIG. 5 is a conceptual schematic view of a demodulation circuit according to a third embodiment of the present invention.

Referring to FIG. 5, a schematic view of a demodulation circuit capable of demodulating ASK and FSK signals according to another embodiment of the present invention is shown. The first circuit 34, the second circuit 8, the third circuit 9, and the fourth circuit 30 are substantially the same as those shown in FIG. 3 or FIG. 4. The difference lies in that a fifth circuit 13 shared by the third unit 10 and the first unit 11 is added in the fourth circuit 30, and the fifth circuit 13 essentially provides a reference clock signal. Usually, the first unit 11 and the third unit 10 may each have respective clock signal necessary for their work. But, to simplify the whole structure of the fourth circuit 40, all the working units needing reference clock can be made to share a reference clock. It should be understood that, the lowest frequency of signals provided by the fifth circuit 13 should satisfy the reference clock frequency demand of a component needing the highest reference clock frequency. As described above, persons skilled in the art may also provide the fifth circuit 13 outside the fourth circuit 30, and the connecting relationship between the fifth circuit 13 and the first unit 11 and the third unit 10 remains the same as described above.

Moreover, it should be further illustrated that another difference with the above embodiment lies in that, a component (not shown) can be provided inside or outside of the fourth circuit 30, so as to record label information of determined demodulation manners. The component can be a status switch, and can also be a register or a memory. In brief, the component can be utilized to store label information, which may be status information such as circuit "on" or "off", or digital logic "0" or "1." The status information is configured to indicate which modulation scheme is to be used by the second unit 12 to demodulate the signals output by the first unit 11 and output the demodulated data. With the component configured to determine the demodulation manner, when it intends to demodulate an incoming signal, the second unit 12 first accesses the component, detects the status information stored in the component, so as to determine which modulation rule is to be used to decide the signal.

If the set label information implies that ASK signals are to be demodulated, the signals output by the first unit 11 are demodulated according to the modulation rule of the ASK signals. That is to say, when the signals are ASK, generally, level "0" represents no pulses, and level "1" represents continual pulses. The second unit 12 judges whether the original data is "0" or "1" through a counting value in a predefined time (the predefined time should be selected in the pulse width range of the ASK signals), thereby restoring correct data. In this way, the second unit 12 may retain the data in an acceptable fluctuation range, filter signals beyond the range, thus filtering interferences.

If the set label information implies that FSK signals are to be demodulated, the signals output by the first unit 11 are demodulated according to the modulation rule of the FSK signals. That is to say, when the signals are FSK, generally, level "0" represents pulses in a first frequency, and level "1" represents pulses in a second frequency. The second unit 12 judges whether the original data is "0" or "1" through a counting value in a predefined time (the predefined time should be selected in the pulse width range of the FSK signals), thereby restoring correct data. In this way, the second unit 12 may retain the data in an acceptable fluctuation range, filter signals beyond the range, thus filtering interferences.

Using the demodulation circuit of the above two embodiments, it can be selected to demodulate the ASK signals or the FSK signals according to the arrangement conveniently and flexibly, so that the system using such a demodulation circuit has great expandability.

Based on the above embodiments, the demodulation part in the indoor unit or the outdoor unit in the existing digital microwave system can be replaced with the above demodulation circuit, thus constituting a new digital microwave system. In the new digital microwave system, if the demodulation unit of the indoor unit or the outdoor unit adopts the above demodulation circuit, the demodulation manner of the indoor unit or the outdoor unit can be made to match with that of the outdoor unit or the indoor unit so long as the demodulation manner of the second unit 12 is set accordingly in the indoor unit or the outdoor unit, no matter the outdoor unit or the indoor unit uses ASK or FSK scheme to modulate signals. Hardware circuit of the whole system does not need to be changed. In this way, the entire digital microwave system can be set flexibly, and has relatively strong digital interference resistance capability. If both the indoor unit and the outdoor unit of the above digital microwave system use the above demodulation circuit, the entire digital microwave system has a better flexibility and a stronger digital interference resistance capability.

Figure 6:
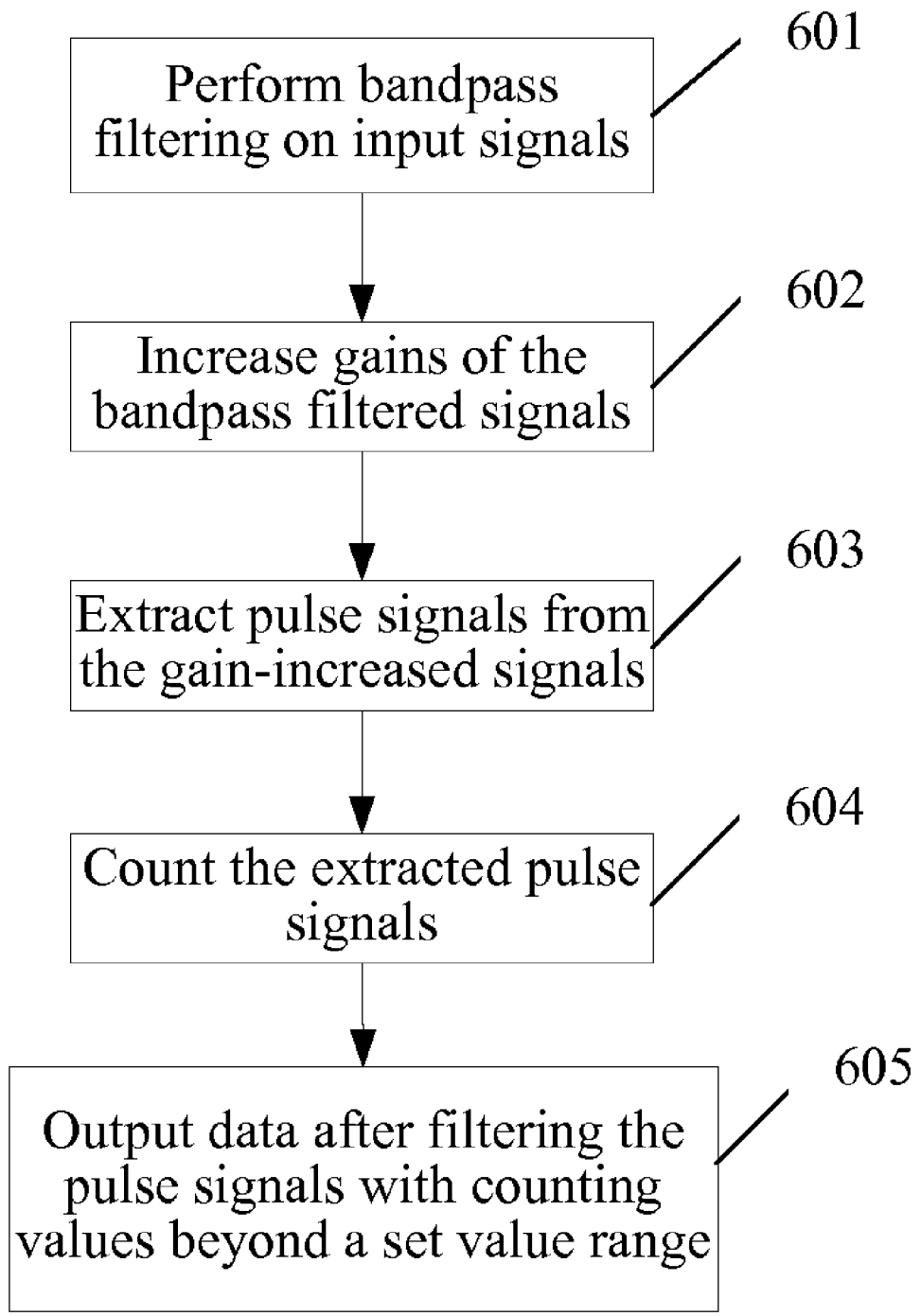
FIG. 6 is a schematic flowchart of demodulating according to a fourth embodiment of the present invention.

Referring to FIG. 6, a schematic flow chart of a demodulation processing method capable of demodulating ASK signals and FSK signals according to an embodiment of the present invention is shown. In this embodiment, the method includes the following processing operations.

In step 601, bandpass filtering is performed on input ASK or FSK signals, so as to eliminate other signals possibly carried by the ASK signals or the FSK signals, including some high frequency clutters or noises brought by the power.

In step 602, the ASK signals or the FSK signals subjected to the bandpass filtering are amplified to increase gains of the signals.

In step 603, pulse signals are extracted from the ASK signals or the FSK signals with increased gains.

In step 604, the extracted pulse signals are detected to filter scattered pulses with smaller pulse widths as compared with the ASK signals or the FSK signals, eliminate the burrs in the signals caused by interference, and the effective pulses obtained through the detecting are counted accordingly.

In step 605, the counted data is decided according to a modulation rule of the signals, so as to filter the pulse signals with counting values beyond a predetermined range, and finally the acquired data is output.

Figure 7:
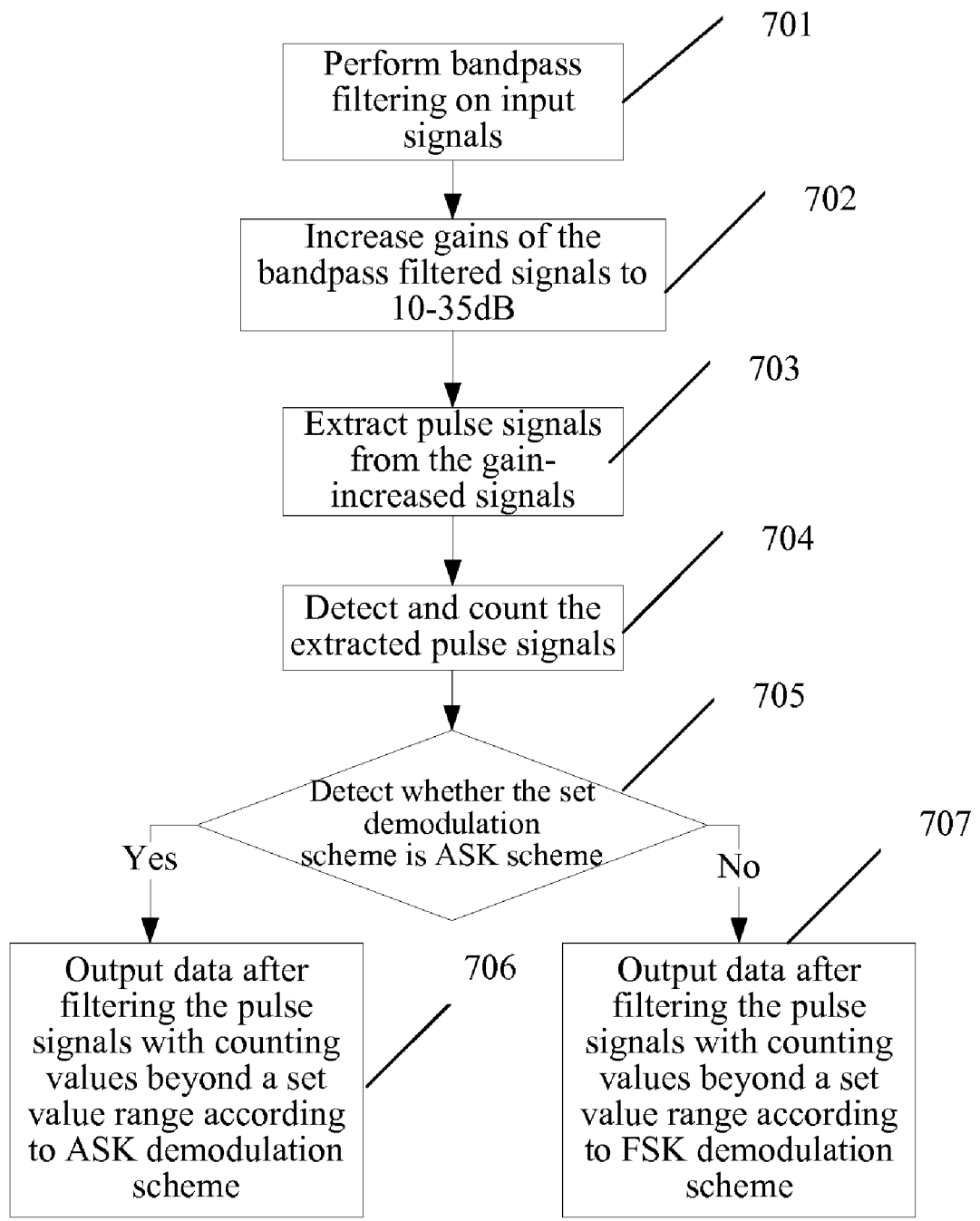
FIG. 7 is a schematic flowchart of demodulating according to a fifth embodiment of the present invention.

Referring to FIG. 7, a modified technical solution to the above embodiment is shown. Steps 701 to 704 are the same as the steps 601 to 604 in the above embodiment. The main modification lies in that before the counted data is decided, i.e., in step 705, whether the set demodulation manner is ASK scheme is detected. A component configured to determine demodulation manners may be accessed first. The component may be a status switch, and may also be a register or a memory. In brief, the component can be utilized to store label information, which may be status information such as circuit "on" or "off", or digital logic "0" or "1." The status information is configured to indicate which modulation scheme is to be used to demodulate the signals output by the pulse counting circuit when deciding, and output the demodulated data.

For the case in which the label information indicates that ASK signals are to be demodulated, step 706 is performed, i.e., the signals output by the pulse counting are demodulated according to the modulation schemes of the ASK signals. That is to say, when the signals are ASK, generally, level "0" represents no pulses, and level "1" represents continual pulses. During the decision, whether the original data is "0" or "1" can be judged through a counting value in a predefined time (the predefined time should be selected in the pulse width range of the ASK signals), thereby restoring correct data. In this way, the decision may retain the data in an acceptable fluctuation range, filter signals beyond the range, thus filtering interferences.

For the case in which the label information indicates that FSK signals are to be demodulated, step 707 is performed, i.e., the signals output by the pulse counting are demodulated according to the modulation schemes of the FSK signals. That is to say, when the signals are FSK, generally, level "0" represents pulses in a first frequency, and level "1" represents pulses in a second frequency. During the decision, whether the original data is "0" or "1" can be judged through a counting value in a predefined time (the predefined time should be selected in the pulse width range of the FSK signals), thereby restoring correct data. In this way, the decision may retain the data in an acceptable fluctuation range, filter signals beyond the range, thus filtering interferences.

Moreover, in order that the gains of the ASK signals or the FSK signals subjected to bandpass filtering are suitable for subsequent pulse extraction, the increased gain value can be set in the range of 10-35 dB in the flow of the above two embodiments. For bandpass filtered signals having small gains, relatively high gain values may be used, for example, 30 dB or 35 dB. In contrast, for bandpass filtered signals having large gains, relatively small gain values may be used, for example, 10 dB or 15 dB. Generally, it is preferred to set the gain value to 20 dB.

In the above flow, a pulse detection step can be added after the pulse extraction and before the pulse counting. This step aims to detect the extracted pulse signals according to a reference clock signal with a frequency much higher than the signal frequency, so as to filter the burr pulses with pulse widths smaller than a desired width. That is to say, the scattered pulses (usually interference) are filtered to only output the effective pulse signals for pulse counting.

By using the processing flow of the above specific embodiments, both ASK signals and FSK signals can be demodulated, a hardware equipment using the flow can be an integrated demodulation circuit that is capable of demodulating both ASK signals or FSK signals, and can also be a demodulation component provided in the indoor unit or the outdoor unit of the digital microwave system. In this way, both ASK signals and FSK signals can be demodulated while filtering the ASK signals and FSK signals, so that the arrangement of the signal demodulation part in the digital microwave system is simple and flexible.

It should be noted that, persons skilled in the art may appreciate that all or partial steps of the method of the above embodiments can be implemented in a program instruction related hardware. The programs can be stored in a computer readable medium. When being executed, the program includes the steps of the above methods. The storage medium is, for example, ROM/RAM, magnetic disks, compact disks, and so on.

What are described above are only several embodiments of the present invention, and the scope of the present invention is not limited thereto. Those skilled in the art can readily appreciate that any modifications or replacing contents that can be readily conceived shall fall in the scope of the present invention.

What is claimed is:

1. A demodulation circuit, comprising:
a first circuit, configured to perform bandpass filtering on input signals;
a second circuit, configured to increase gains of signals generated by the first circuit after the bandpass filtering;
a third circuit, configured to extract pulse signals from signals output from the second circuit; and
a fourth circuit, comprising:
a first unit, configured to count the pulse signals extracted by the third circuit;
a second unit, connected with the first unit, and configured to perform a data decision based on the counting according to a determined demodulation scheme, and output demodulated data; and
a component, connected with the second unit, and configured to record label information for the demodulation scheme;
wherein the performing the data decision comprises one of the following two ways:
if the input signals are amplitude shift keying (ASK) signals and the label information implies that the ASK signals are to be demodulated, the second unit judges whether original data has no pulses or contains continual pulses through a counting value in a predefined time, so as to restore the demodulated data; and
if the input signals are frequency shift keying (FSK) signals and the label information implies that the FSK signals are to be demodulated, the second unit judges whether the original data is pulses in a first frequency or pulses in a second frequency through a counting value in the predefined time, so as to restore the demodulated data.

2. The demodulation circuit according to claim 1, wherein the third circuit comprises a comparator having an input end connected to an output of the second circuit and another input end connected to a threshold level; wherein the comparator is configured to compare the signals output from the second circuit with a predefined threshold level and extract the pulse signals above the predefined threshold level.

3. The demodulation circuit according to claim 2, further comprising a unit connected in series between the third circuit and the fourth circuit, wherein the unit is configured to detect the pulse signals extracted by the third circuit and filter burr pulses having pulse widths smaller than a desired pulse width of the extracted pulse signals.

4. The demodulation circuit according to claim 3, further comprising a fifth circuit configured to provide a reference clock for the fourth circuit and the unit.

5. The demodulation circuit according to claim 1, further comprising a unit connected in series between the third circuit and the fourth circuit, wherein the unit is configured to detect the pulse signals extracted by the third circuit and filter burr pulses having pulse widths smaller than a desired pulse width of the extracted pulse signals.

6. The demodulation circuit according to claim 1, wherein a gain of the second circuit is in the range of 10-35 dB.

7. A digital microwave system, comprising an indoor unit, an outdoor unit, and an intermediate frequency cable connecting the indoor unit and the outdoor unit, wherein at least one of the outdoor unit and the indoor unit comprises a demodulation circuit, and the demodulation circuit comprises:
   a first circuit, configured to perform bandpass filtering on input signals;
   a second circuit, configured to increase gains of signals generated by the first circuit after the bandpass filtering;
   a third circuit, configured to extract pulse signals from signals output from the second circuit; and
   a fourth circuit, comprising:
   a first unit, configured to count the pulse signals extracted by the third circuit;
   a second unit, connected with the first unit, and configured to perform a data decision based on the counting according to a determined demodulation scheme, and output demodulated data; and
   a component connected with the second unit and configured to record label information for the demodulation scheme;
   wherein the performing the data decision comprises one of the following two ways:
   if the input signals are amplitude shift keying (ASK) signals and the label information implies that the ASK signals are to be demodulated the second unit judges whether original data has no pulses or contains continual pulses through a counting value in a predefined time, so as to restore the demodulated data; and
   if the input signals are frequency shift keying (FSK) signals and the label information implies that the FSK signals are to be demodulated, the second unit judges whether the original data is pulses in a first frequency or pulses in a second frequency through a counting value in the predefined time, so as to restore the demodulated data.

8. The digital microwave system according to claim 7, wherein the third circuit comprises a comparator having an input end connected to an output of the second circuit and another input end connected to a threshold level; wherein the comparator is configured to compare the signals output from the second circuit with a predefined threshold level, and extract the pulse signals above the predefined threshold level.

9. The digital microwave system according to claim 8, further comprising a unit connected in series between the third circuit and the fourth circuit, wherein the unit is configured to detect the pulse signals extracted by the third circuit and filter burr pulses having pulse widths smaller than a desired pulse width of the extracted pulse signals.

10. The digital microwave system according to claim 7, further comprising a unit connected in series between the third circuit and the fourth circuit, wherein the unit is configured to detect the pulse signals extracted by the third circuit and filter bun pulses having pulse widths smaller than a desired pulse width of the extracted pulse signals.

11. A demodulation method, comprising:
   performing bandpass filtering on input signals;
   increasing gains of the filtered input signals after the bandpass filtering;
   extracting pulse signals from the gain-increased filtered input signals after increasing gains;
   counting the extracted pulse signals;
   recording label information for a demodulation scheme;
   performing a data decision based on the counting according to the demodulation scheme; outputting demodulated data;
   wherein the performing the data decision based on the counting according to the demodulation scheme comprises one of the following two ways:
   if the input signals are amplitude shift keying (ASK) signals and the label information implies that the ASK signals are to be demodulated, judging whether original data has no pulses or contains continual pulses through a counting value in a predefined time, so as to restore the demodulated data; and
   if the input signals are frequency shift keying (FSK) signals and the label information implies that the FSK signals are to be demodulated, judging whether the original data is pulses in a first frequency or pulses in a second frequency through a counting value in the predefined time, so as to restore the demodulated data.

12. The demodulation method according to claim 11, wherein extracting the pulse signals from the input signals after increasing gains comprises:
   comparing the gained-increased filtered input signals with a predefined threshold level, and extracting the pulse signals above the predefined threshold level.

13. The demodulation method according to claim 11, wherein before counting the extracted pulse signals, the method further comprises:
   detecting the extracted pulse signals; and
   filtering burr pulses having pulse widths smaller than a desired pulse width of the extracted pulse signals.

\* \* \* \* \*